US008574431B2

(12) United States Patent
Lindsley (10) Patent No.: US 8,574,431 B2
(45) Date of Patent: Nov. 5, 2013

(54) FILTER SYSTEM WITH GAS AGITATION

(75) Inventor: Kurt M. Lindsley, Madison, WI (US)

(73) Assignee: Municipal Filtration Company, LLC, Madison, WI (US)

( * ) Notice: Subject to any disclaimer, the term of this patent is extended or adjusted under 35 U.S.C. 154(b) by 1036 days.

(21) Appl. No.: 12/050,512

(22) Filed: Mar. 18, 2008

(65) Prior Publication Data

US 2009/0236298 A1   Sep. 24, 2009

(51) Int. Cl.
*B01D 29/66* (2006.01)
(52) U.S. Cl.
CPC ..................................... *B01D 29/66* (2013.01)
USPC ............................ 210/108; 210/408; 210/412
(58) Field of Classification Search
CPC ..................................................... B01D 29/661
USPC .................. 210/108, 143, 408, 198, 411, 412, 210/321.69
See application file for complete search history.

(56) References Cited

U.S. PATENT DOCUMENTS

| | | | |
|---|---|---|---|
| 3,193,100 | A | 7/1965 | Broughton |
| 3,298,523 | A | 1/1967 | Johnson |
| 3,534,855 | A | 10/1970 | Guillerd et al. |
| 3,635,348 | A | 1/1972 | Carr |
| 3,709,362 | A | 1/1973 | Lindstol |
| 3,820,658 | A | 6/1974 | Cruze, Jr. |
| 3,841,485 | A | 10/1974 | Malkin |
| 3,948,773 | A | 4/1976 | Tucker |
| 4,055,500 | A | 10/1977 | Parker |
| 4,436,633 | A | 3/1984 | Robinsky et al. |
| 4,565,631 | A | 1/1986 | Bitzer et al. |
| 4,632,757 | A | 12/1986 | Rosenberg |
| 5,006,265 | A | 4/1991 | Kar et al. |
| 5,013,457 | A | 5/1991 | Mims |
| 5,032,294 | A | 7/1991 | Schulz |
| 5,087,355 | A | 2/1992 | Godec |
| 5,194,149 | A | 3/1993 | Selbie et al. |
| 5,288,399 | A | 2/1994 | Schulz |
| 5,374,351 | A | 12/1994 | Bolton et al. |
| 5,413,721 | A | 5/1995 | Schmitt |
| 5,494,109 | A | 2/1996 | Schmitt |
| 5,587,074 | A | 12/1996 | Lynch et al. |
| 5,707,527 | A | 1/1998 | Knutson et al. |
| 5,714,077 | A | 2/1998 | Brown et al. |
| 5,879,552 | A | 3/1999 | Bradfield |

(Continued)

OTHER PUBLICATIONS

Aqua-Aerobic Systems, Inc., "AquaDisk™ Filter, Cloth Media Filters," Copyright 1997.

(Continued)

*Primary Examiner* — Terry Cecil
(74) *Attorney, Agent, or Firm* — Michael Best & Friedrich LLP (57) ABSTRACT

A wastewater filter assembly comprising a filter having an influent side and an effluent side, a backwash system adapted to control flow of backwash fluid from the effluent side to the influent side, and an agitation system adapted to control the flow of an agitating fluid (e.g., air) from the influent side to the effluent side. In one embodiment, the agitation system includes an agitating tank that stores the agitating fluid, and a series of valves to control the flow of backwash fluid and agitating fluid. In another embodiment, the assembly further includes a control system that controls the backwash system and the agitation system. Preferably, the control system is programmed to pulse the agitation system during operation of the backwash system.

12 Claims, 7 Drawing Sheets

(56) References Cited

U.S. PATENT DOCUMENTS

| | | |
|---|---|---|
| 5,906,751 A | 5/1999 | Parker |
| 6,132,626 A | 10/2000 | Hart |
| 6,524,481 B2 * | 2/2003 | Zha et al. .................. 210/636 |
| 6,562,246 B2 | 5/2003 | McGowan |
| 6,596,158 B1 | 7/2003 | Cowan |
| 7,378,024 B2 * | 5/2008 | Bartels et al. .............. 210/636 |
| 7,476,322 B2 * | 1/2009 | Dimitriou et al. ........... 210/615 |
| 7,531,042 B2 * | 5/2009 | Murkute et al. ............. 134/1 |
| 2003/0000883 A1 | 1/2003 | Roberts et al. |
| 2004/0195159 A1 | 10/2004 | Potts |
| 2004/0232076 A1 * | 11/2004 | Zha et al. .................. 210/636 |
| 2007/0187326 A1 * | 8/2007 | Bonnelye et al. ............ 210/636 |
| 2010/0176070 A1 * | 7/2010 | Han ........................ 210/798 |

OTHER PUBLICATIONS

EIMCO Process Equipment Company, "EIMCO® Filter Media Services," Copyright 1993.
United States Filter Corporation, "Hydrotech Discfilter: Filtration Made Simple," Copyright 2001.

* cited by examiner

FILTER SYSTEM WITH GAS AGITATION

FIELD OF THE INVENTION

The present invention relates to the field of fluid filtration, and particularly to filtering wastewater.

BACKGROUND OF THE INVENTION

Before wastewater can be passed to rivers, lakes, or other waterways, suspended solids within the water must be removed. An existing method of filtering suspended solids from wastewater uses a cloth media filter of woven polyester. The cloth media filter is typically attached to a supporting framework to form a media panel, and typically multiple media panels are utilized.

While filtering the wastewater, the fluid flows through the media from an inflow or influent side of the media to an outflow or effluent side of the media. Eventually, the influent side of the media becomes clogged with the material that is being filtered from the fluid. This requires the influent side of the media to be cleaned before further filtering can occur.

One known method of cleaning the influent side of the media is accomplished by rotating the media panels past a cleaning head that is in close contact with the influent side of the media panel. This method is utilized when the influent side of the media faces away from the internal framework. Using a pump, a cleaning head places a negative pressure on the media to create a vacuum that removes solids that accumulate on the influent side of the media. The media panel is rotated past the cleaning head to clean the entire panel.

In another known method, the cleaning of the influent side of the media is accomplished by a spray head that is positioned adjacent to the effluent side of the media. This method is utilized when the influent side of the media faces the internal framework. Using a pump, a pressurized fluid stream is sprayed against the effluent side of the media panel. This forces the fluid through the media, dislodging the filtered material from the influent side of the media panel, into a collection trough. The media panel is rotated past the cleaning head to clean the entire panel.

Each of these known methods of cleaning the media panel requires equipment to rotate the panels. This may include such equipment as motors, gearing, and drive systems. In addition, a pump is required to either pressurize the cleaning fluid or to create a vacuum to remove solids from the surface of the media panel. The use of a pump and equipment to rotate the media panels adds to the cost of operating and maintaining the filtration system. Also, due to the complexity and design limitations of the equipment, expanding the capacity of the filtration system can be difficult and expensive. It is common, therefore, for prior art wastewater filtration systems to be designed for a specific capacity, without the ability to easily expand.

SUMMARY

The present invention provides a wastewater filter assembly comprising a filter having an influent side and an effluent side, a backwash system adapted to control flow of backwash fluid from the effluent side to the influent side, and an agitation system adapted to control the flow of an agitating fluid (e.g., air) from the influent side to the effluent side. In one embodiment, the agitation system includes an agitating tank that stores the agitating fluid, and a series of valves to control the flow of backwash fluid and agitating fluid.

In another embodiment, the assembly further includes a control system that controls the backwash system and the agitation system. Preferably, the control system is programmed to pulse the agitation system during operation of the backwash system.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

FIGS. 1-8 refer to a filter system that is similar to that disclosed in U.S. patent application Ser. No. 11/211,411, now abandoned, assigned to Municipal Filtration Company, LLC of Madison, Wis., which is incorporated herein in its entirety.

Figure 1:
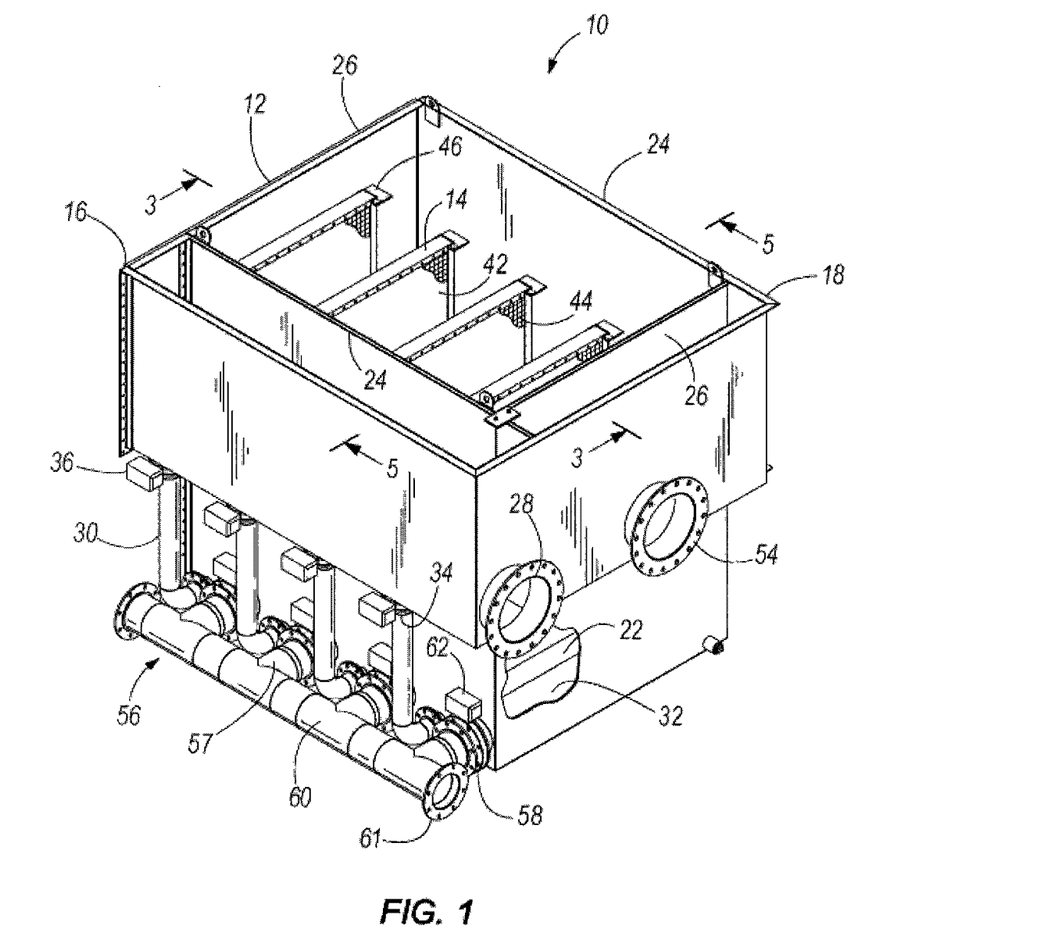
FIG. 1 is a perspective view of a filter assembly embodying the present invention.

Referring to FIG. 1, the illustrated filter assembly 10 includes a tank 12 that houses a series of filter panels 14. An influent trough 16 is positioned on a side of the tank, and an effluent trough 18 is positioned on another side of the tank.

The tank 12 includes a base plate 22 that is secured to two side plates 24 and two end plates 26 to form a container to house the filter panels 14. The plates of the tank are secured to each other using flange connections. It should be understood, however, the tank can be formed in any suitable manner, such as by welding. The tank can be formed from any suitable material, such as 304 stainless steel, painted steel, concrete, fiber reinforced plastic (FRP), acrylonitrile butadiene styrene (ABS) plastic, polyvinyl chloride (PVC) plastic or any combination thereof.

The influent trough 16 includes an influent port 28 for fluid communication between the influent trough 16 and an influent supply conduit (not shown). At the base of the influent trough are a series of influent pipes 30 providing fluid communication between the influent trough and a series of corresponding lower channels 32. The influent trough can be formed from any suitable material, such as 304 stainless steel, painted steel, concrete, fiber reinforced plastic (FRP), acrylonitrile butadiene styrene (ABS) plastic, polyvinyl chloride (PVC) plastic or any combination thereof.

Each influent pipe 30 includes an influent valve 34 that controls the flow to the lower channels 32. The influent valve is movable between an open position and a close position to provide selective fluid communication between the influent trough 16 and a corresponding lower channel 32. The influent valve may comprise any suitable valve, such as a butterfly, ball, gate or globe valve. An actuator 36 is used to actuate the influent valve 34. Any suitable actuator can be used, such as pneumatic, electronic, or manual, for operating the influent valve.

Figure 2:
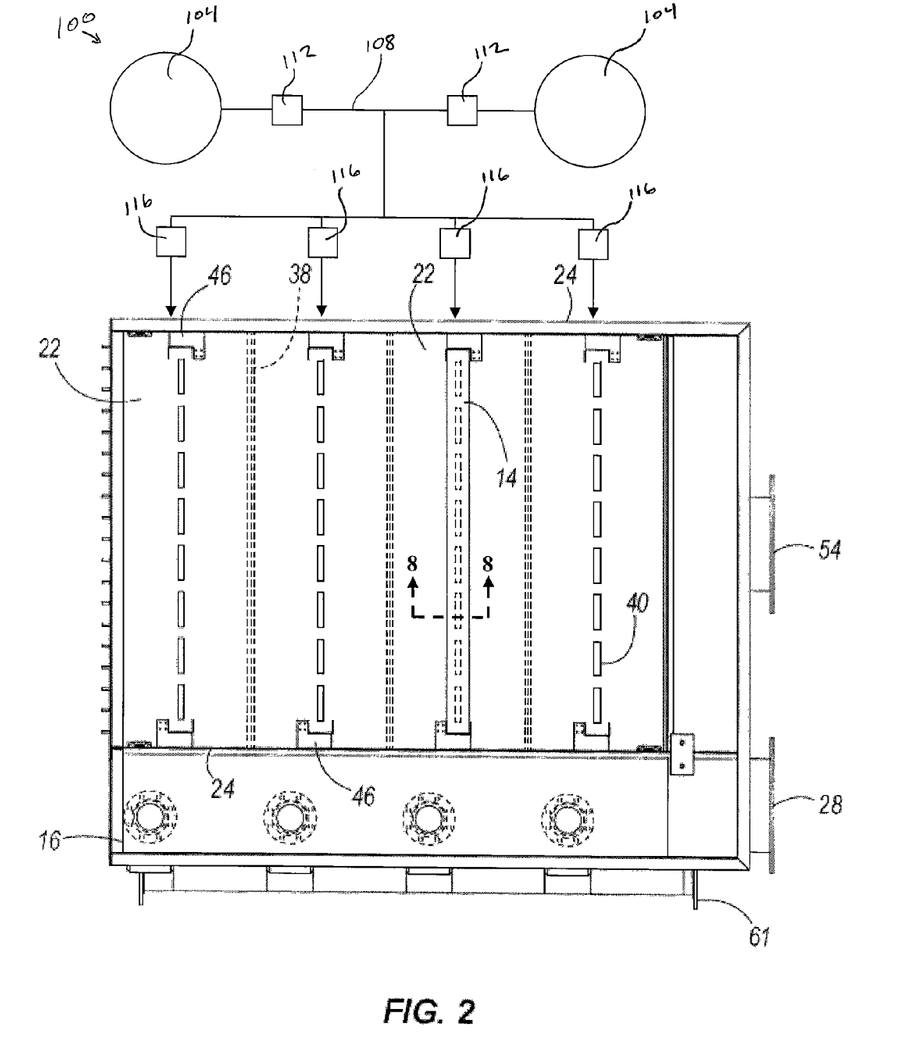
FIG. 2 is a plan view of the filter assembly of FIG. 1 including an air system.
Figure 3:
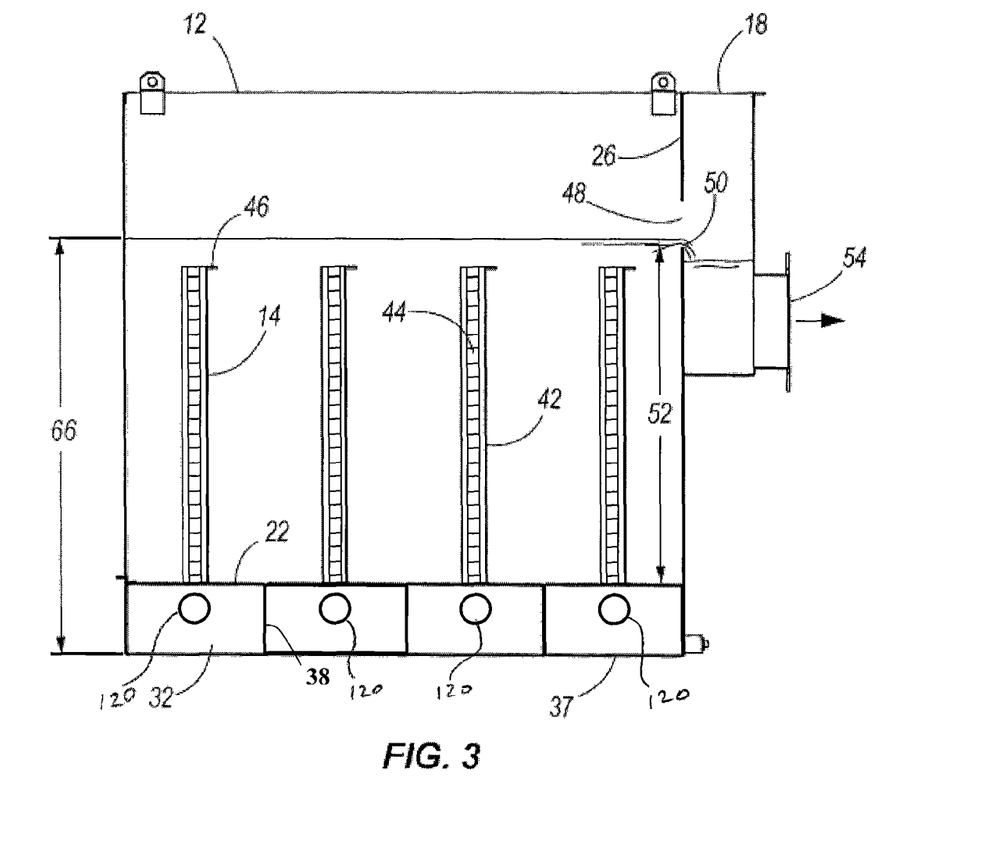
FIG. 3 is a section view taken along line 3-3 of FIG. 1.
Figure 5:
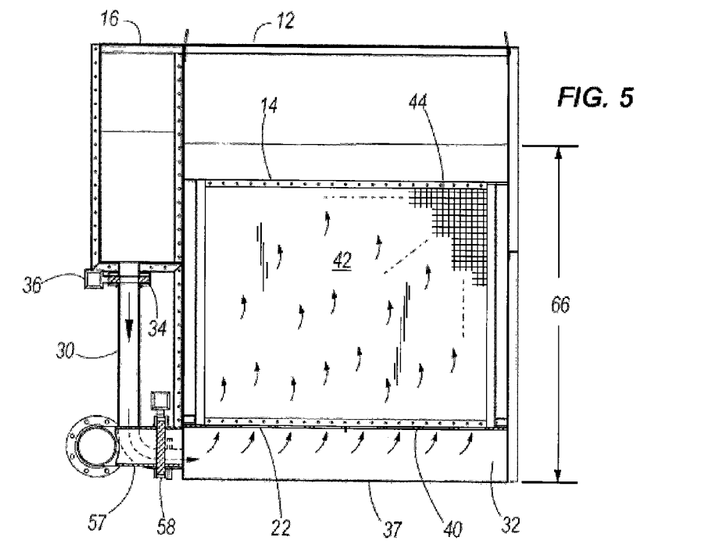
FIG. 5 is a section view taken along line 5-5 of FIG. 1 showing the assembly in a filtering mode.

Referring to FIGS. 3 and 5, the lower channels 32 include a bottom plate 37 and side walls 38 to provide a fluid tight seal between adjacent channels. The base plate 22 of the tank 12 defines the top of the channels 32. A series of orifices 40 (see FIG. 2) on the base plate 22 provide fluid communication between each channel and a corresponding filter panel 14.

Figure 7:
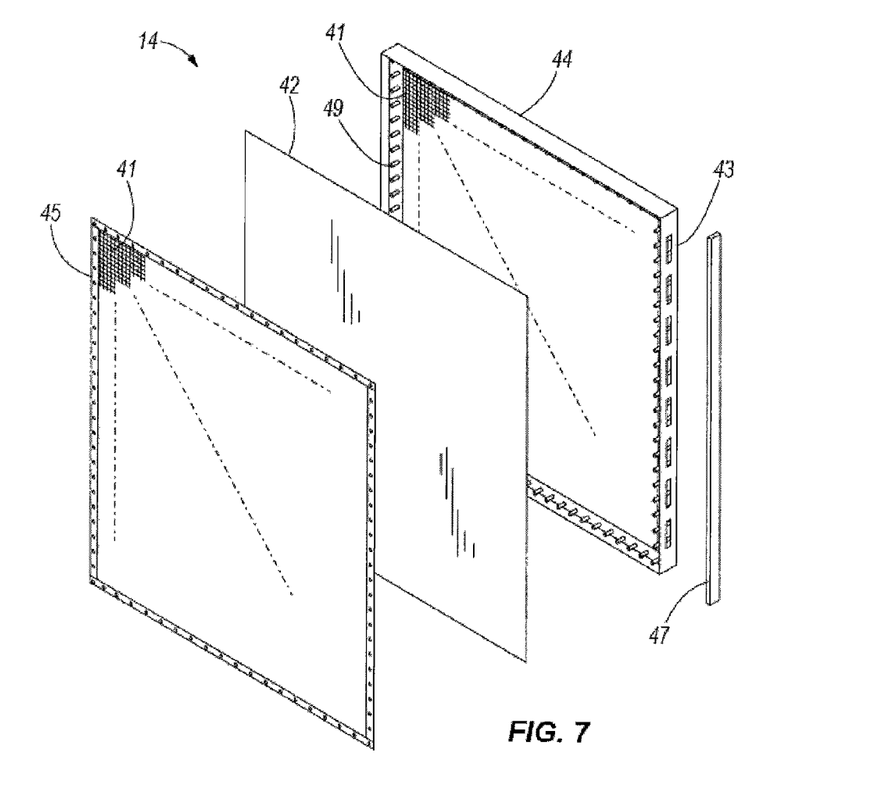
FIG. 7 is an exploded perspective view of the filter panel shown in FIG. 1.

Referring to FIG. 7, each filter panel 14 includes two sheets of filter media 42 supported on an interior surface by an inner cage 44, and each sheet being supported on an exterior surface by a similar outer cage 45 (only one sheet of filter media 42 and one outer cage 45 is shown in FIG. 7, the other sheet of filter media 42 and the other outer cage 45 being attached to the backside of the inner cage 44). To support the filter media, the inner and outer cages include a grid work 41 having large openings. The illustrated filter media 42 is a cloth media filter. The cloth media filter includes filters formed from pile or woven materials, such as cotton, nylon, polyester, wire, polymer, or other suitable materials. Furthermore, an additional filter (not shown) can be placed at locations throughout the filter assembly 10, such as at the influent port 28 or in the influent pipe 30 to pre-filter large particles from the wastewater. The illustrated inner cage is coupled to both outer cages using threaded fasteners 49, but any suitable technique could be used (such as bonding, riveting, molding, etc.). In other embodiments, the inner cage may be releasably clamped to the outer cages. The inner cage 44 includes a series of openings 43 designed to mate with the orifices 40 to provide a sealed pathway between each channel and the interior (influent side) of the corresponding filter panel 14. A gasket 47 is placed between the top surface of the base plate 22 and the bottom surface of the filter panels 14, inhibiting unfiltered wastewater from by-passing the filter panel.

A series of brackets 46 are coupled to the side plate 24 to support and allow removal of the filter panels 14 (FIG. 2). The brackets may be formed from any suitable support, such as a 'C' channel. Each filter panel 14 spans the distance between both side plates 24, as shown in FIG. 2. A clamp, such as a toggle clamp sold by Destaco, or other method may be used to hold the filter panel 14 firmly in position with the ability to be released for removal of the filter panel.

Figure 4:
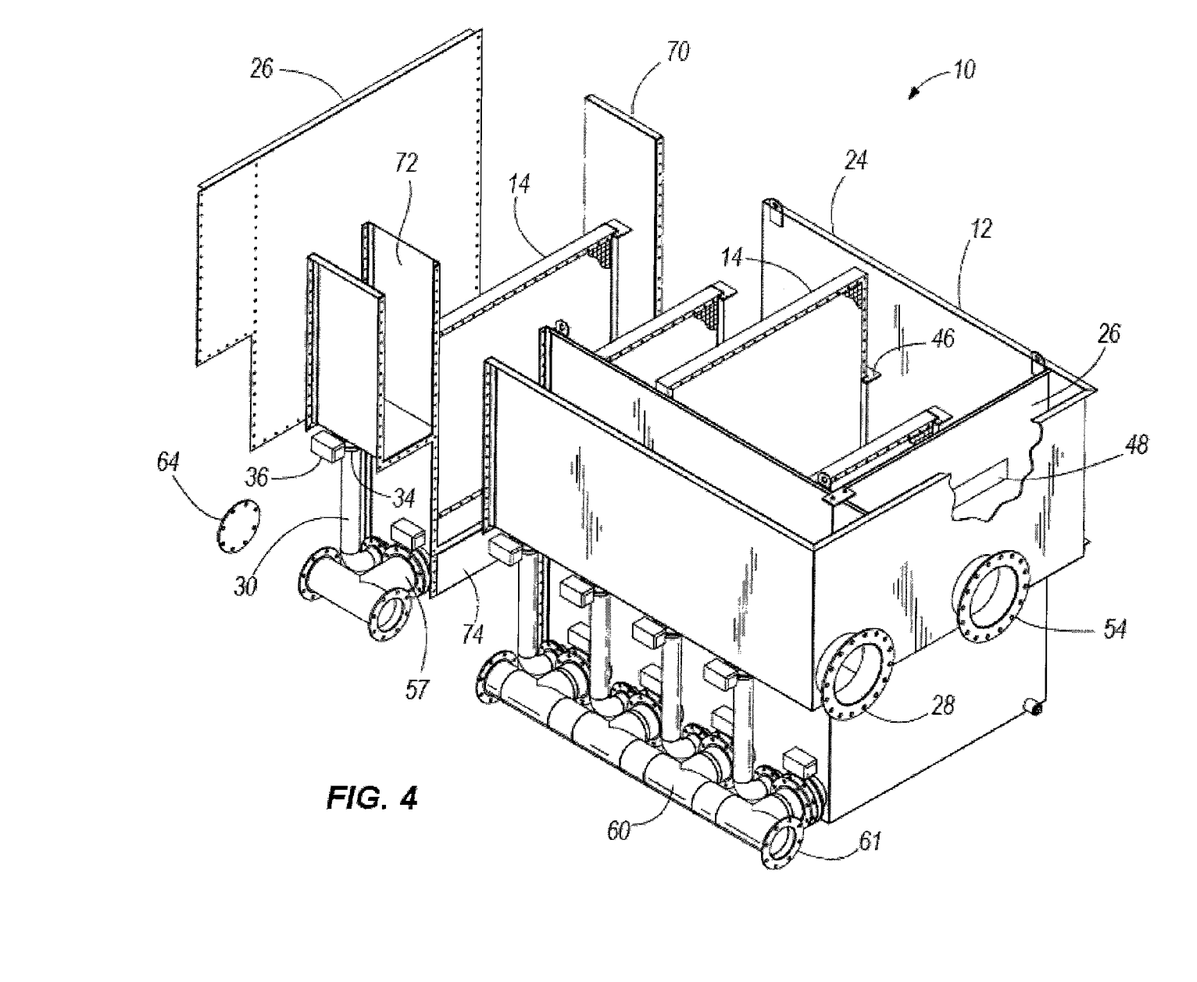
FIG. 4 is an exploded perspective view of the filter assembly of FIG. 1 showing the addition of a filter cell to expand the capacity of the system.

Referring to FIGS. 3 and 4, an effluent opening 48 in the end plate 26 provides fluid communication between the tank 12 and the effluent trough 18. A weir 50 is movably coupled to the end plate 26, and placed within the opening 48 to define a weir height 52. An effluent port 54 provides fluid communication between the effluent trough 18 and an effluent conduit (not shown).

Referring to FIG. 1, the filter assembly 10 also includes a backwash piping assembly 56. The backwash piping assembly includes a backwash pipe 57 and a backwash valve 58 coupled between each lower channel 32 and a backwash manifold 60 that leads to a backwash port 61. Each backwash valve 58 is movable between an open position and a close position to provide selective fluid communication between the corresponding lower channel 32 and the backwash manifold 60. The backwash valve may comprise any suitable valve, such as a butterfly, globe, gate or ball valve. An actuator 62 is also coupled to each backwash valve 58. Any suitable actuator can be used, such as a pneumatic, electronic, or manual actuator, for operating the backwash valve.

As best seen in FIG. 4, the filter assembly 10 comprises a series of filter cells 70. Each filter cell 70 comprises an influent segment 72, an influent pipe 30 (including an influent valve 34 and actuator 36), a channel segment 74, and a filter panel 14. The filter assembly typically contains at least four filter cells to allow for adequate flow during backwashing, described later. However, based on desired capacity, additional filter cells 70 may be attached to the filter assembly 10. This is accomplished by removing the end plate 26 and a blind flange 64. The additional filter cell 70 is coupled to the side plates 24, base 22, influent trough 16, and backwash manifold 60. The end plate 26 and blind flange 64 are coupled to the additional filter cell 70. This process can be repeated to include any number of filter cells 70. It should be understood that any suitable method of coupling the additional filter cell to the filter assembly may be utilized, including a bolted flange connection or welded connection.

In operation, unfiltered wastewater enters the filter assembly 10 from the influent port 28 and passes into the influent trough 16. Either a pump or gravity may generate the head required to fill the influent trough 16 to a desired level with wastewater. When a particular filter cell is in the filtering mode, the backwash port is closed, and the influent valve 34 is in the open position to pass wastewater down from the influent, trough 16 through the influent pipe 30, and into the lower channel 32 (FIG. 5).

Using the head created by gravity, the wastewater continues to pass upwards from the lower channel 32 through the orifices 40 and into the filter panel 14 (FIG. 5). Solids in the wastewater are trapped by the filter media 42 and collect on the inner surface of the filter media. The filtered water exits the filter panel 14 and enters the tank 12.

Due to the head loss in the flow path from the influent trough 16 to the tank 12, the filtered water will fill the tank to a level 66 slightly less than that of the influent trough (FIG. 5). Filtered water exits the tank 12 through the effluent opening 48 and passes into the effluent trough 18 where it exits the filter assembly through the effluent port 54.

Figure 6:
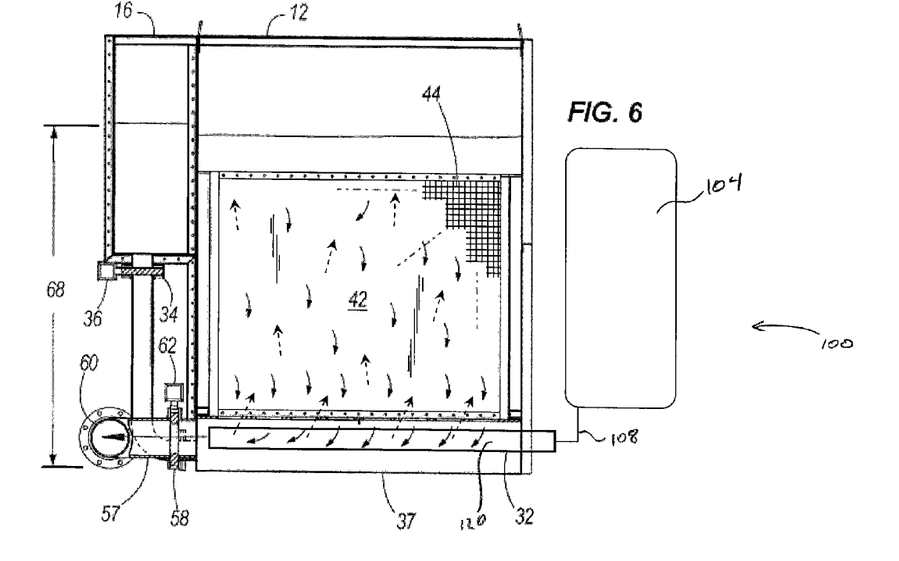
FIG. 6 is the section view of FIG. 5 showing the assembly in a backwashing and agitating mode.

As solids collect on the interior surface of the filter media 42, the wastewater level in the influent trough 16 rises due to the increased head loss in the flow path from the influent trough through the filter media 42. The weir 50, with the weir height 52, is positioned to control the wastewater level in the influent trough 16. Increasing the weir height causes the wastewater level in the influent trough to rise, while decreasing the weir height lowers the wastewater level in the influent trough. At a designated level 68 in the influent trough or at a periodic time interval, a backwash cycle is initiated to remove the collected solids from the interior surface of the filter media 42 (FIG. 6). To initiate the backwash cycle for a particular filter cell, the influent valve 34 for that cell is placed in the close position, and the backwash valve 58 for that cell is opened.

With the backwash valve 58 open and the influent valve 34 closed, the difference in water level between the tank 12 and lower channel 32 allows filtered water from the tank to flow in reverse through the filter media 42. Solids collected on the interior surface of the filter media are washed from the surface through the lower channel 32 and into the backwash manifold 60 where they are eventually discharged through the backwash port 61. The cage 44 supports the interior surface of the filter media 42 during the backwash to prevent the filter media from collapsing inwards.

Typically, only one filter cell 70 is being backwashed while the remainder continue to filter wastewater. Once the backwash is complete for a given filter cell, that cell is returned to service and begins filtering wastewater. This is accomplished by closing the backwash valve 58 and opening the influent valve 34. After the filter cell begins filtering wastewater, a different filter cell may be backwashed using the same method previously described. It should be understood that the entire backwash process may be automated through the use of a control system. For example, a programmable logic controller (PLC) may be used. Other control system may be used to automate the backwash process and other components as is known by those skilled in the art. The wastewater level 68 in the influent trough 16 may be measured by a float or ultrasonic sensor and monitored by the control system. The control system may be programmed to backwash each filter cell in any particular order and for any duration of time required to properly remove solids collected on the inside surface of the filter media 42. In addition, depending on the number of filter cells that comprise the filter assembly 10, more than one filter cell may be backwashed at any given time.

Eventually the filter media 42 requires replacement. The filter media can be replaced while wastewater continues to be filtered through the remaining filter cells 70. Replacement of the filter media 42 is initiated by closing the influent valve 34 and the backwash valve 58 for the corresponding filter cell 70 that requires filter media replacement. Closing the influent valve and the backwash valve isolates the lower channel 32 from influent and backwash flow. With both the influent valve 34 and the backwash valve 58 closed the filter panel 14 may be lifted upwards out of the tank 12 (FIG. 4). With the filter panel outside of the tank, the filter media 42 may be removed from the cage 44 and replaced. The filter panel is then slid back into position, guided by the brackets 46, and secured in place using a clamp or other means (FIG. 2). By opening the influent valve 34, while leaving the backwash valve 58 closed, the filter cell 70 begins to once again filter wastewater from the influent trough 16 (FIG. 5).

In addition to the backwash piping assembly 56, the invention provides an agitation assembly 100 that includes a fluid system 104, a fluid delivery system 108, fluid supply valves 112, distribution valves 116, and distribution pipes 120. FIGS. 2, 3, 6, and 8 show various features of the agitation system 100.

With reference to FIGS. 2 and 6, each illustrated fluid system 104 includes a compressor (not shown) that compresses a fluid and a storage tank or agitating tank that holds the pressurized agitating fluid for later use. For example, an air compressor and compressed air holding tank may be used to supply compressed air to the agitation assembly 100 such that the agitating fluid utilized is air. In one embodiment, the fluid system 104 includes an air compressor and two compressed air holding tanks. In other embodiments, the fluid system 104 may include more or less components including more or less holding tanks. For example, the fluid system 104 may include a heat exchanger assembly to dry the agitating fluid before storage, or the storage tank may be removed and the compressor may directly supply the agitation assembly 100. In addition, different fluids in a liquid or gaseous form may be used, such as oxygen, carbon dioxide, or any combination of fluids. It is advantageous to use a fluid that is less dense than the water being filtered, as is known by those skilled in the art.

The illustrated fluid delivery system 108 includes a number of pipes and connections that interconnect the fluid system 104 and the distribution pipes 120 of the agitation system. The illustrated fluid supply valves 112 connect the fluid system 104 to the fluid delivery system 108 and define an open position wherein the agitating fluid within the holding tanks communicates with the fluid delivery system 108 and a closed position wherein the agitating fluid within the holding tanks is inhibited from communication with the fluid delivery system 108. This arrangement allows a single holding tank to communicate with the fluid distribution system 108 while the other holding tank is filled with agitating fluid. In the illustrated embodiment, the fluid supply valves 112 are electronically operated. For example, the fluid supply valves 112 may be gas solenoid valves that are actuated by a signal from the control system. Each fluid supply valve 112 in the agitation system 100 is individually controlled such that one fluid supply valve 112 may be open while another fluid supply valve 112 is closed. In other embodiments, the valves may be mechanically operated, manually operated or controlled in another way.

Each illustrated distribution valve 116 connects the fluid delivery system 108 to one of the distribution pipes 120 (see FIG. 6) and defines an open position wherein the pressurized agitating fluid within the fluid delivery system 108 communicates with the distribution pipe 120 associated with the distribution valve 116, and a closed position wherein the agitating fluid within the fluid delivery system 108 is inhibited from communication with the distribution pipe 120 associated with the distribution valve 116. In the illustrated embodiment, the distribution valves 116 are electronically operated. For example, the distribution valves 116 may be gas solenoid valves that are actuated by a signal from the control system. Each distribution valve 116 in the agitation system 100 is individually controlled such that one distribution valve 116 may be open while another distribution valve 116 is closed. The fluid supply valves 112 and the distribution valves 116 may be opened such that the agitation assembly 100 is activated in conjunction with the activation of the backwash cycle.

Each illustrated distribution pipe 120 includes a plurality of apertures (not shown) spaced along a top edge, and is positioned within a respective lower channel 32 as shown in FIGS. 3 and 6. The distribution pipes 120 are positioned under the filter panels 14 within the lower channels 32 such that when the distribution valves 116 are in the open position agitating fluid may flow out of the apertures and up through the filter panel 14 to dislodge solids from the filter media 43. The agitating fluid is less dense than the fluid being filtered and will rise out of the apertures and through the filter media 43 in the filtering direction (opposite to the backwash flow direction). In other embodiments, the distribution pipes 120 may be arranged differently or may have different shapes. In addition, more than one distribution pipe 120 may be positioned in each lower chamber 32. Furthermore, the apertures may be spaced differently, have different shapes, may be on a different side of the distribution pipe 120, or be arranged differently.

It is noted that the flow of the agitation fluid is in the opposite direction to that of the backwash fluid. As a result, the flow of the agitation fluid can interfere with the flow of the backwash fluid. The illustrated embodiment addresses this by pulsing the distribution valve 116 during the backwashing procedure. More specifically, the distribution valve 116 is repeatedly opened and closed. This procedure accomplishes two benefits. First, it provides periods of time (when the valve 116 is closed) where the backwashing fluid is not fighting the agitation fluid and thus has a chance to flow at full velocity to dislodge particles on the filter. Second, the pulsing results in a changing flow rate of the backwash fluid and the agitation fluid, thereby resulting in additional turbulence at the filtering surface. It is believed that this pulsing of the agitation fluid enhances the removal of debris from the filter. In one embodiment, the agitation system is pulsed 6 times (1 second open and 4 seconds closed) during a typical agitation cycle lasting 30 seconds. In other embodiments, the agitation cycle may be different and include a different number of pulses or may operate in a on/off manner (i.e. 30 seconds on). In addition, each pulse may be timed differently.

Figure 8:
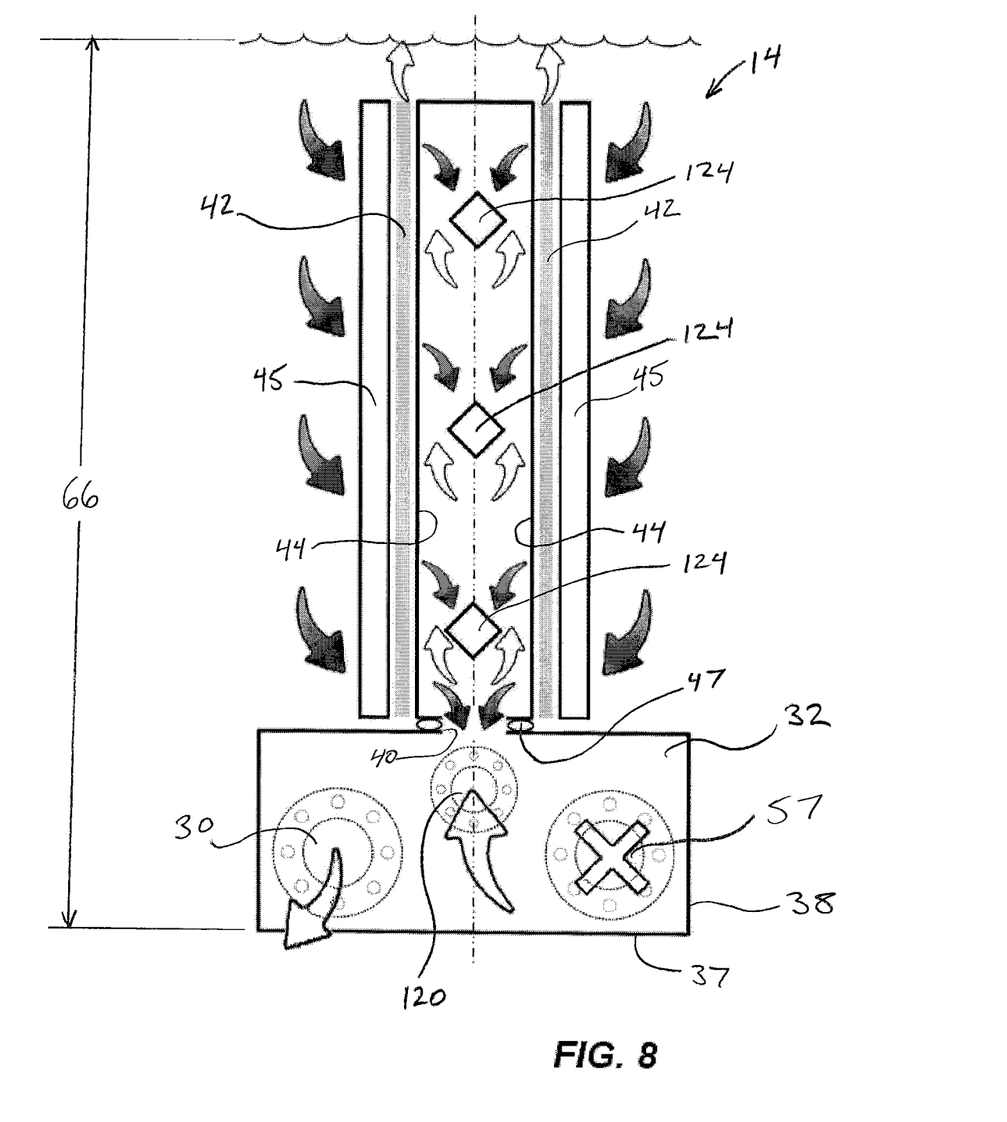
FIG. 8 is a section view taken along line 8-8 of FIG. 2.

Baffles 124 may be positioned within the filter panels 14 as shown in FIG. 8. The baffles 124 further agitate the flow of fluid from the distribution pipes 120. In addition, the baffles 124 inhibit inward collapse of the walls of the filter panel 14. In other embodiments, the baffles 124 may be removed, arranged differently, or may have a different shape.

Operation of the agitation assembly 100 will hereunder be described with reference to FIG. 8. During the backwash cycle, the influent valve 34 is placed in the close position, and the backwash valve 58 is opened creating the backwash operation described above. FIG. 6 shows the backwash water as solid arrows flowing through the filter panel 14, and FIG. 8 shows the backwash water as darkened arrows flowing through the filter panel 14. In addition to the backwash cycle, an agitation cycle may be operated. During the agitation cycle, one fluid supply valve 112 is moved to the open position thereby supplying agitating fluid from the fluid system 104 to the fluid delivery system 108. The distribution valve 116 associated with the filter panel 14 that is experiencing the backwash cycle is then opened, providing pressurized agitating fluid to the distribution pipe 120. The agitating fluid escapes the distribution pipe 120, through apertures (not shown) in the distribution pipe 120, and flows through the filter panel 14 to further dislodge solids and other material from the filter media 42. FIG. 6 shows the agitating fluid as dashed arrows, and FIG. 8 shows the agitating fluid as light arrows.

The backwash cycle produces a flow of water in a first direction from the exterior surface of the filter panel 14 to the interior surface of the filter panel 14. The agitation cycle produces a flow of agitating fluid in a second direction opposite the first direction from the interior surface of the filter panel 14 to the exterior surface of the filter panel 14. The counter-flow of the water and the agitating fluid creates a turbulence that increases the ability of the system to remove solids from the filter media 42. In addition, the flow of agitating fluid passes over the baffles 124 such that additional turbulence is created increasing the ability of the agitation system 100 to effectively dislodge solids and other material from the filter media 42.

The control system may be programmed to initialize the backwash cycle and agitation cycle for each filter cell in any particular order and for any duration of time required to properly remove solids collected on the inside surface of the filter media 42. In addition, depending on the number of filter cells that comprise the filter assembly 10, more than one filter cell may be backwashed and agitated at any given time. Furthermore, all cells may be backwashed and agitated at the same time.

Various features and advantages of the invention are set forth in the following claims.

What is claimed is:

1. A wastewater filter assembly comprising:
   a filter having an influent side and an effluent side, the filter being positioned to filter influent to produce effluent;
   a backwash system adapted to control flow of backwash fluid from the effluent side to the influent side;
   an agitation system having an aperture positioned on an influent side of the filter and at a level below at least a portion of the filter and adapted to control the flow of agitating fluid from the influent side to the effluent side, wherein the agitating fluid is less dense than the wastewater being filtered; and
   a control system programmed to control the backwash system and the agitation system in such a manner that the flow of backwash fluid flows in a first direction through the filter while the agitating fluid flows in a second direction through the filter opposing the first direction.

2. The wastewater filter assembly of claim 1, wherein the agitating fluid comprises a gas.

3. The wastewater filter assembly of claim 1, wherein the agitation system includes an agitating tank that stores the agitating fluid.

4. The wastewater filter assembly of claim 1, wherein the control system is programmed to activate the agitation system during operation of the backwash system.

5. The wastewater filter assembly of claim 1, wherein the control system is programmed to pulse the agitation system during operation of the backwash system.

6. A wastewater filter assembly comprising:
   a filter having an influent side and an effluent side, the filter being positioned to filter influent to produce effluent;
   a backwash system adapted to control a flow of backwash fluid from the effluent side to the influent side;
   an agitation system adapted to control a flow of agitating fluid wherein the agitating fluid is less dense than the wastewater being filtered; and
   a control system programmed to control the backwash system and the agitation system in such a manner that the flow of backwash fluid flows in a first direction through the filter while agitating fluid flows in a second direction through the filter opposing the first direction.

7. The wastewater filter assembly of claim 6, wherein the agitating fluid comprises a gas.

8. The wastewater filter assembly of claim 6, wherein the agitation system includes an agitating tank that stores the agitating fluid.

9. The wastewater filter assembly of claim 6, wherein the control system is programmed to activate the agitation system during operation of the backwash system.

10. The wastewater filter assembly of claim 6, wherein the agitation system includes an aperture positioned on the influent side of the filter and below at least a portion of the filter.

11. The wastewater filter assembly of claim 10, wherein the agitation system includes a distribution valve that controls the flow of agitation fluid to the aperture, wherein the backwash system includes a backwash valve that controls the flow of backwash fluid, and wherein the control system is programmed to have both the distribution valve and the backwash valve open at the same time.

12. The wastewater filter assembly of claim 6, further comprising an orifice positioned on the influent side of the filter, the orifice defining a path through which backwash fluid flows, wherein the agitation system includes an aperture through which agitating fluid flows, and wherein the orifice is positioned between the filter and the aperture.

\* \* \* \* \*